United States Patent
Nishiguchi et al.

(10) Patent No.: US 10,286,907 B2
(45) Date of Patent: May 14, 2019

(54) VEHICLE AND LANE CHANGE TIMING DETERMINATION METHOD

(71) Applicant: HONDA MOTOR CO., LTD., Tokyo (JP)

(72) Inventors: Haruhiko Nishiguchi, Wako (JP); Satoshi Fujii, Wako (JP); Ryohsaku Arakawa, Wako (JP); Daisuke Kubota, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 15/614,918

(22) Filed: Jun. 6, 2017

(65) Prior Publication Data

US 2017/0349173 A1    Dec. 7, 2017

(30) Foreign Application Priority Data

Jun. 6, 2016    (JP) .................................. 2016-112545

(51) Int. Cl.
*G08G 1/16* (2006.01)
*B60W 30/09* (2012.01)
*B60W 30/16* (2012.01)
*B62D 15/02* (2006.01)

(52) U.S. Cl.
CPC .......... *B60W 30/09* (2013.01); *B60W 30/162* (2013.01); *B62D 15/0255* (2013.01); *G08G 1/166* (2013.01); *G08G 1/167* (2013.01); *B60R 2300/804* (2013.01); *B60R 2300/8086* (2013.01)

(58) Field of Classification Search
CPC .... B60W 30/09; B60W 30/162; G08G 1/167; G08G 1/166; B62D 15/0255; B60R 2300/8086; B60R 2300/804
See application file for complete search history.

(56) References Cited

U.S. PATENT DOCUMENTS

| | | | | |
|---|---|---|---|---|
| 10,163,353 | B2* | 12/2018 | Glander | G08G 1/167 |
| 2004/0193374 | A1* | 9/2004 | Hac | B60K 31/0008 |
| | | | | 701/301 |
| 2009/0088925 | A1* | 4/2009 | Sugawara | B60W 30/12 |
| | | | | 701/41 |
| 2016/0264136 | A1* | 9/2016 | Minoiu Enache | B60W 30/02 |
| 2017/0066444 | A1* | 3/2017 | Habu | B60W 30/162 |
| 2017/0232970 | A1* | 8/2017 | Schaper | B60W 30/18163 |
| | | | | 701/36 |

FOREIGN PATENT DOCUMENTS

JP    2009-78735 A    4/2009

* cited by examiner

*Primary Examiner* — Thomas Ingram
(74) *Attorney, Agent, or Firm* — Westerman, Hattori, Daniels & Adrian, LLP

(57) ABSTRACT

In a vehicle or a lane change timing determination method, when a distance from a vehicle to a nearby vehicle is outside of a first distance threshold value, lane changing is determined to be permitted. When the distance is within the first distance threshold value, lane changing is determined not to be permitted. After determining lane changing to be not permitted, lane changing not being permitted is switched to lane change being permitted when the nearby vehicle decelerates or accelerates to move further away from the vehicle than a second distance threshold value, even if the distance is still within the first distance threshold value.

11 Claims, 6 Drawing Sheets

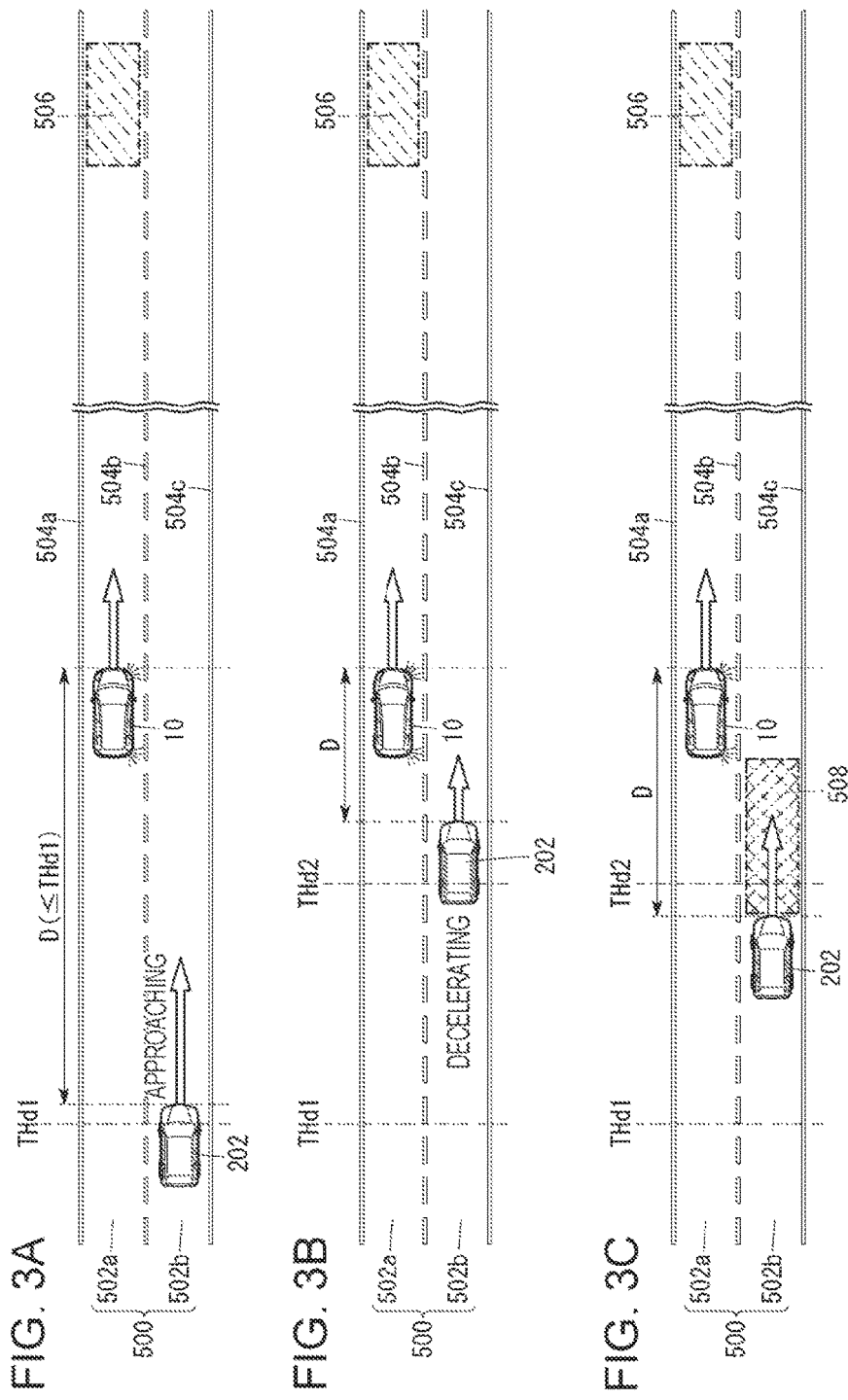

VEHICLE AND LANE CHANGE TIMING DETERMINATION METHOD

CROSS REFERENCES TO RELATED APPLICATIONS

The present application claims priority under 35 U.S.C. § 119 to Japanese Patent Application No. 2016-112545, filed Jun. 6, 2016, entitled "Vehicle and Lane Change Timing Determination Method." The contents of this application are incorporated herein by reference in their entirety.

TECHNICAL FIELD

The present disclosure relates to a vehicle and a lane change timing determination method that determine a timing of a lane change in order to provide guidance to a driver regarding a timing for an automatic lane change based on driver operation or a manual lane change, or in order for the vehicle to perform the automatic lane change automatically.

BACKGROUND

Japanese Unexamined Patent Application Publication No. 2009-078735 seeks to provide a driving assistance device capable of controlling lane changing safely, even when there is no space into which lane changing can be performed ([0005], Abstract).

In order to achieve this, the driving assistance device of Japanese Unexamined Patent Application Publication No. 2009-078735 (Abstract) includes an assistance start section that starts lane change assistance, a detection section that detects a relative distance and a relative speed between an own-vehicle and another vehicle, and a computation section that, based on the relative distance and relative speed, computes a collision risk degree with the other vehicle when the own-vehicle to change lanes. The driving assistance device further includes a first determination section that determines the permissibility of lane changing based on the relative distance, the relative speed, and the collision risk degree; a decision section that decides on a target space for lane changing based on the relative distance and relative speed in cases in which lane change cannot be performed; and a second determination section that determines whether or not a space that allows lane change exists in the target space. The driving assistance device further includes a setting section that sets a target speed toward a standby position for lane change when such a space does not exist, and that sets a target speed toward a position where lane changing is possible when such a space does exist; and a controller that controls the speed of the own-vehicle so as to become the target speed.

In Japanese Unexamined Patent Application Publication No. 2009-078735, specifically, the permissibility of lane change is determined based on an inter-vehicle distance and a time-to-collision (TTC) (FIG. 7, [0033]). In cases in which lane change is not permissible (S250 in FIG. 2: NO), the driver is warned (S300 in FIG. 2, FIG. 9).

In Japanese Unexamined Patent Application Publication No. 2009-078735, in a case in which another vehicle concedes a space for the own-vehicle to change lanes, determination is thus switched to determination that a space allowing safe lane change is present in the target space, and the speed control toward the position where lane changing is possible is started ([0075], FIG. 14(e)).

SUMMARY

Japanese Unexamined Patent Application Publication No. 2009-078735 refers to cases in which the other vehicle concedes a space for the own-vehicle to change lanes ([0075], FIG. 14(e)). However, Japanese Unexamined Patent Application Publication No. 2009-078735 does not appear to describe a specific method for determining a case in which the other vehicle has conceded a space for the own-vehicle to change lanes.

Moreover, the permissibility of lane change is, specifically, determined based on the inter-vehicle distance and the time-to-collision (TTC) (FIG. 7, [0033]). It is not made clear how this determination relates to the other vehicle conceding a space for the own-vehicle to change lanes.

Note that the permissibility of lane change is not limited to the relationship with the other vehicle as a following vehicle, and it is also necessary to consider the relationship with vehicles ahead (see case 3 in FIG. 11 of Japanese Unexamined Patent Application Publication No. 2009-078735).

The present application describes, for example, a vehicle and lane change timing determination method capable of performing lane changing quickly in cases in which a nearby vehicle is present in an adjacent lane.

A vehicle according to one aspect of the present disclosure includes: a surroundings information acquisition device configured to acquire surroundings information including position information of a nearby vehicle travelling in an adjacent lane; and an electronic control unit configured to employ the position information of the nearby vehicle to guide a timing of an automatic or manual lane change or to execute the automatic lane change. The electronic control unit includes a distance computation section configured to compute a distance from the vehicle to the nearby vehicle, and a lane change permission determination section configured to determine permissibility of the lane change and to output a determination result. The lane change permission determination section is configured to determine lane changing to be permitted when the distance is greater than a first distance threshold value, and determine lane changing to be not permitted when the nearby vehicle is approaching the vehicle and the distance is shorter than the first distance threshold value. After determining lane changing to be not permitted due to the nearby vehicle approaching the vehicle, the lane change permission determination section is configured to switch the determination result from lane changing not permitted to lane changing permitted when the nearby vehicle decelerates or accelerates to move further away from the vehicle than a second distance threshold value, even if the distance is still shorter than the first distance threshold value.

Accordingly, after determining lane changing to be not permitted due to the nearby vehicle approaching the vehicle, the lane change permission determination section switches the determination result from lane changing not permitted to lane changing permitted when the nearby vehicle decelerates or accelerates to move further away from the vehicle than the second distance threshold value, even if the distance between the vehicle and the nearby vehicle is still shorter than the first distance threshold value. Accordingly, for example, this enables quick lane changing from the point in time that the second distance threshold value that is shorter than the first distance threshold value has been exceeded when a nearby vehicle (a following vehicle) has decelerated to open up a space for the vehicle to change lanes.

Alternatively, this enables quick lane changing from the point in time that the second distance threshold value that is shorter than the first distance threshold value has been exceeded in cases in which a nearby vehicle (a vehicle ahead) accelerates to open up a space to allow the vehicle to change lanes, or in cases in which it is clear that a nearby vehicle (a vehicle ahead) will open up a space by accelerating.

Configuration may be made wherein flashing of a direction indicator lamp or a command to flash the direction indicator lamp is one condition for the lane change permission determination section to start output of the determination result for the permissibility of the lane change.

Accordingly, the determination result for the permissibility of the lane change is not output when the direction indicator lamp is not flashing. Therefore, when lane change is not required, determination results for the permissibility of lane change are not output, enabling the presentation of information of low importance to be omitted. This enables the convenience for the driver to be improved.

Configuration may be made wherein in cases in which the nearby vehicle is a following vehicle traveling further to the rear than the vehicle, the lane change permission determination section is configured to determine whether or not a current lane in which the vehicle is traveling is unsuitable for travel ahead. The current lane being unsuitable for travel ahead may be one condition for the lane change permission determination section to start output of the determination result for the permissibility of the lane change.

Accordingly, for example, output of a determination result for the permissibility of lane change can be started when it is anticipated that the nearby vehicle will open up a space for the vehicle to change lanes. Accordingly, when lane change is not required, determination results for the permissibility of lane change are not output, enabling the presentation of information of low importance to be omitted. This enables the convenience for the driver to be improved.

Configuration may be made wherein the lane change permission determination section outputs the determination result for the permissibility of the lane change by using at least one of display or audio. In a configuration in which automatic change is performed as a result of driver operation, or in manual lane change, this enables the permissibility of lane change to be presented in a form that is easy for the driver to recognize.

Configuration may be made wherein in cases in which the determination result for the permissibility of the lane change is output by at least display, the display may include a symbol indicating deceleration or acceleration of the nearby vehicle relative to the vehicle. An occupant (including the driver) can thereby easily visually ascertain the movement of the nearby vehicle relative to the vehicle.

Configuration may be made wherein the lane change permission determination section outputs a display indicating the determination result for the permissibility of the lane change only when the nearby vehicle has a speed of approach to the vehicle exceeding a speed threshold value. Accordingly, for example, a determination result for the permissibility of lane change (an icon or the like) is not displayed for nearby vehicles having a relative speed slower than the vehicle (or moving away from the vehicle). Accordingly, it is possible to emphasize nearby vehicles that require attention, while annoyance caused to the driver by performing display for every nearby vehicle traveling in the adjacent lane can be eliminated.

Alternatively, configuration may be made wherein the lane change permission determination section outputs the determination result for the permissibility of the lane change in the automatic lane change during automated driving. Accordingly, more appropriate lane change can be performed in a configuration in which automatic lane change is performed by automated driving.

A lane change timing determination method of the present disclosure is a lane change timing determination method that determines a timing of an automatic or manual lane change in a vehicle including a surroundings information acquisition device configured to acquire surroundings information including position information of a nearby vehicle traveling in an adjacent lane, and an electronic control unit configured to employ the position information of the nearby vehicle to guide the timing of the automatic or manual lane change or to execute the automatic lane change. The method includes the electronic control unit executing distance computation to compute a distance from the vehicle to the nearby vehicle traveling in the adjacent lane, and lane change permission determination to determine permissibility of the lane change and to output a determination result. In the lane change permission determination, the electronic control unit determines lane changing to be permitted when the distance is greater than a first distance threshold value, and determines lane changing to be not permitted when the nearby vehicle is approaching the vehicle and the distance is shorter than the first distance threshold value. In the lane change permission determination, after determining lane changing to be not permitted due to the nearby vehicle approaching the vehicle, the electronic control unit switches the determination result from lane changing not permitted to lane changing permitted when the nearby vehicle decelerates or accelerates to move further away from the vehicle than a second distance threshold value, even if the distance is still shorter than the first distance threshold value.

For example, the present disclosure enables quick lane changing when a nearby vehicle is present in an adjacent lane.

BRIEF DESCRIPTION OF THE DRAWINGS

The advantages of the disclosure will become apparent in the following description taken in conjunction with the following drawings.

FIG. 3A is a diagram illustrating a first state in a situation in which lane change timing guidance control of an embodiment is performed.

FIG. 3B is a diagram illustrating a second state in a situation in which lane change timing guidance control of an embodiment is performed.

FIG. 3C is a diagram illustrating a third state in a situation in which lane change timing guidance control of an embodiment is performed.

DETAILED DESCRIPTION

A. FIRST EMBODIMENT

A-1. Configuration
A-1-1. Overall Configuration

Figure 1:
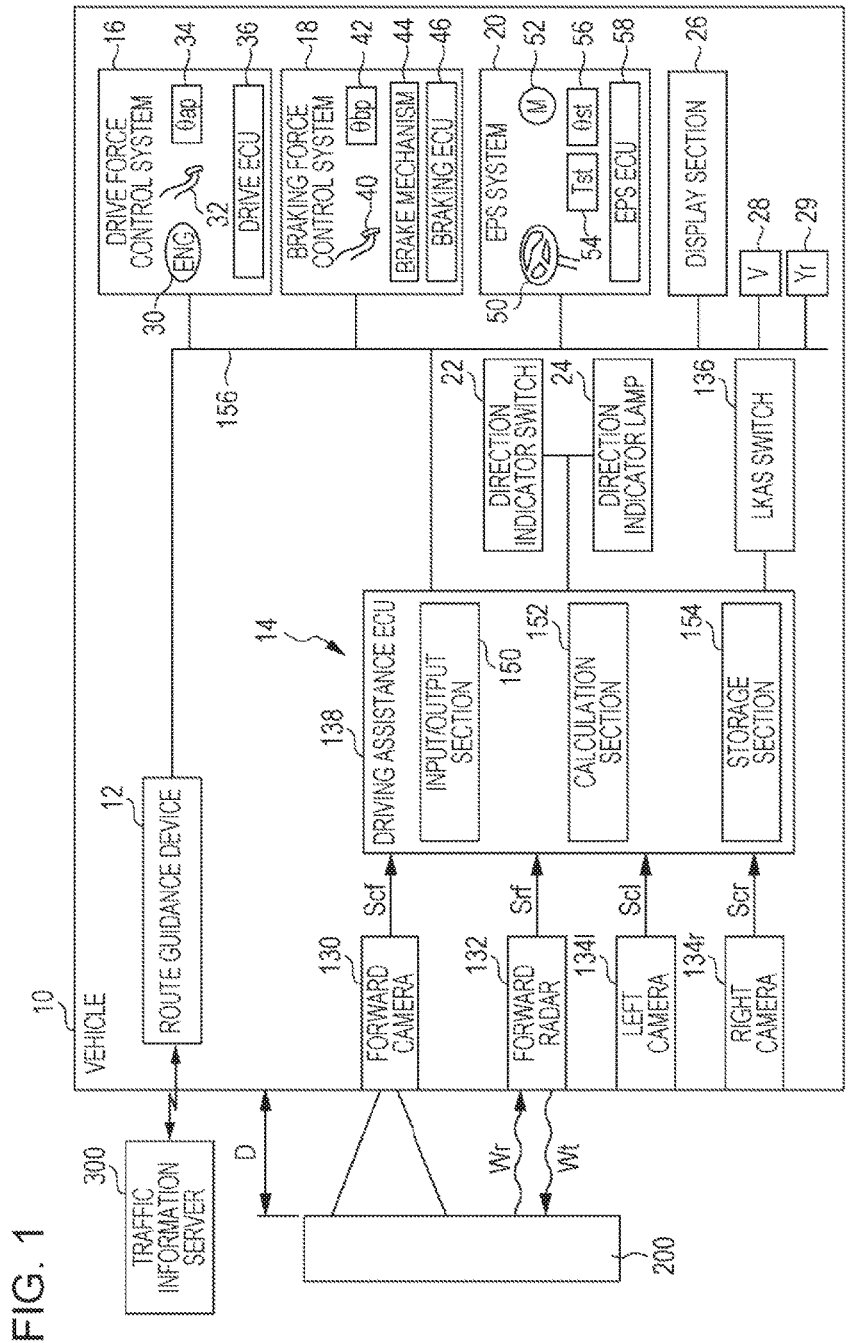
FIG. 1 is a block diagram illustrating configuration of a vehicle according to an embodiment of the present disclosure.

FIG. 1 is a block diagram illustrating configuration of a vehicle 10 according to a first embodiment of the present disclosure. As well as the vehicle 10, FIG. 1 also illustrates a traffic information server 300. The vehicle 10 includes a route guidance device 12, a driving assistance device 14, a drive force control system 16, a braking force control system 18, an electric power steering system 20 (referred to as the "EPS system 20" hereafter), a direction indicator switch 22, direction indicator lamps 24, a display section 26, a vehicle speed sensor 28, and a yaw rate sensor 29.

The route guidance device 12 performs route guidance along a planned route Rv of the vehicle 10 to a destination Pgoal (also referred to below as the "final destination Pgoal") for manual driving or automated driving.

The driving assistance device 14 detects various nearby objects 200 that appear in the vicinity of the vehicle 10 (for example a nearby vehicle 202 (FIG. 3A, etc.), pedestrians and walls (neither of which are illustrated in the drawings), as well as lane markings (such as the lane markings 504a to 504c in FIG. 3A to FIG. 3C)). The driving assistance device 14 uses the nearby objects 200 and the lane markings to assist driving of the vehicle 10.

The drive force control system 16 includes an engine 30 (drive source), an accelerator pedal 32, an accelerator pedal operation amount sensor 34 (also referred to below as the "AP sensor 34"), and a drive electronic control unit 36 (referred to as the "drive ECU 36" hereafter). The AP sensor 34 detects an operation amount θap (also referred to below as the "AP operation amount θap" or the "operation amount θap") (in %) of the accelerator pedal 32.

The drive ECU 36 executes drive force control of the vehicle 10 using the operation amount θap and the like. In drive force control, the drive ECU 36 controls drive force of the vehicle 10 by controlling the engine 30. The drive force control of the present embodiment includes automatic cruise control (ACC). The automatic cruise control is control that causes the vehicle 10 to drive such that a vehicle speed V (km/h) matches a target vehicle speed Vtar, and, in cases in which a leading vehicle is present in the same lane as the vehicle 10, maintains a target distance from the leading vehicle according to the vehicle speed V.

The braking force control system 18 includes a brake pedal 40, a brake pedal operation sensor 42 (also referred to below as the "BP sensor 42"), a brake mechanism 44, and a braking electronic control unit 46 (referred to as the "braking ECU 46" hereafter). The BP sensor 42 detects an operation amount θbp (also referred to below as the "BP operation amount θbp" or the "operation amount θbp") (in %) of the brake pedal 40.

The braking ECU 46 executes braking force control of the vehicle 10 using the BP operation amount θbp and the like. In braking force control, the braking ECU 46 controls braking force of the vehicle 10 by controlling the brake mechanism 44 and the like.

The EPS system 20 includes a steering wheel 50, an EPS motor 52, a torque sensor 54, a steering angle sensor 56, and an EPS electronic control unit 58 (referred to as the "EPS ECU 58" or the "ECU 58" hereafter). The EPS motor 52 is connected somewhere between the steering wheel 50 and the vehicle wheels, not illustrated in the drawings, and applies a steering assist force. The torque sensor 54 detects a torque Tst (also referred to below as "steering torque Tst") (Nm) applied to the steering wheel 50 by a driver. The steering angle sensor 56 detects a steering angle Est (degrees) of the steering wheel 50.

The EPS ECU 58 executes steering assist control to assist steering by the driver by generating steering assist force according to the steering torque Tst and the like.

The direction indicator switch 22 is a switch disposed in the vicinity of the steering wheel 50, and causes the left side (left turn direction) or right side (right turn direction) direction indicator lamp 24 to flash according to driver operation.

The display section 26 displays side images Icl, Icr to the side of the vehicle 10 according to commands from the driving assistance device 14 (for example as the display screens 600a to 600c in FIG. 4A to FIG. 4C, described later). For example, the display section 26 is provided on an instrument panel, not illustrated in the drawings. Alternatively, the display section 26 may be disposed on side mirrors. In other words, the side mirrors may be configured not by mirrors, but by the display sections 26 that display the side images Icl, Icr taken by side cameras 134l, 134r. In cases in which the side cameras 134l, 134r are infrared cameras, the side images Icl Icr are infrared images.

The vehicle speed sensor 28 detects the vehicle speed V of the vehicle 10 and outputs the vehicle speed V to the driving assistance device 14 or the like. The yaw rate sensor 29 detects a yaw rate Yr (deg/sec) of the vehicle 10 and outputs the yaw rate Yr to the driving assistance device 14 or the like.

A-1-2. Route Guidance Device 12

Figure 2:
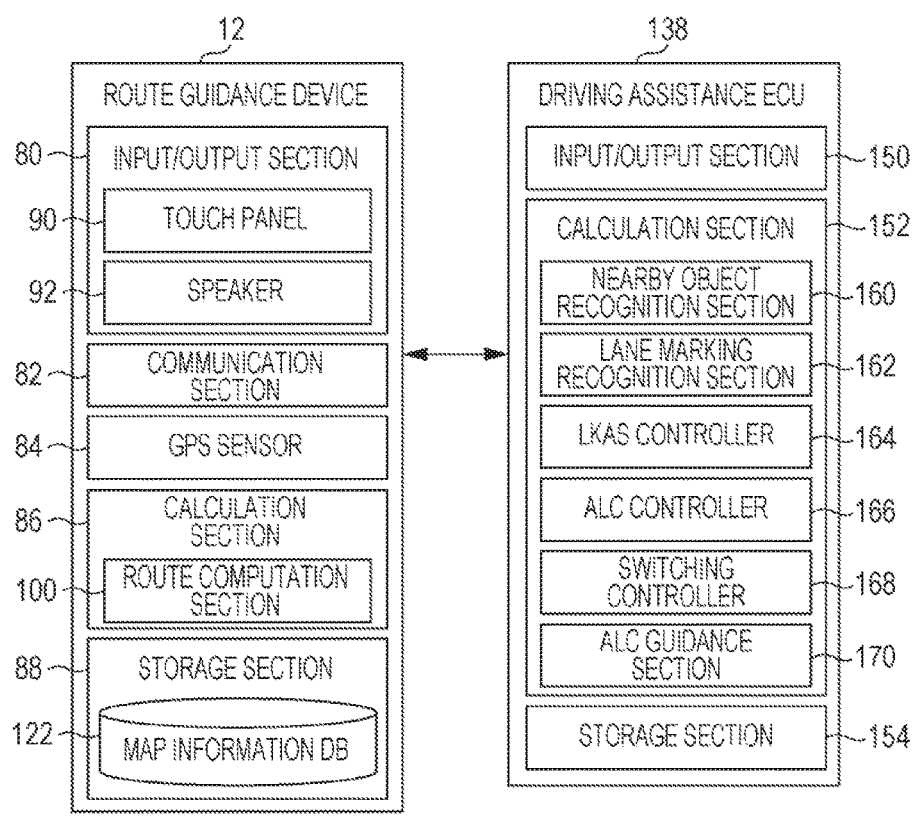
FIG. 2 is a block diagram illustrating details of a route guidance device and configuration peripheral thereto in an embodiment.

FIG. 2 is a block diagram illustrating detailed configuration of the route guidance device 12 of the present embodiment, and configurations peripheral thereto. The route guidance device 12 guides the vehicle 10 along the route Rv to a destination Ptar.

As illustrated in FIG. 2, the route guidance device 12 includes an input/output section 80, a communication section 82, a global positioning system sensor 84 (referred to as the "GPS sensor 84" hereafter), a calculation section 86, and a storage section 88. The input/output section 80 performs input and output of signals between the route guidance device 12 and other sections, and includes an operation input/output device (HMI: Human-Machine Interface) for occupant (including driver) operation. The input/output section 80 of the present embodiment includes a touch panel 90 and a speaker 92.

The communication section 82 (communication device) performs wireless communication with external devices. The external devices referred to here include, for example, the traffic information server 300 (FIG. 1). The traffic information server 300 provides the route guidance devices 12 of respective vehicles 10 with traffic information such as accident information and roadworks information. The external devices may alternatively include a route guide server. A route guide server generates or computes the route Rv instead of the route guidance device 12 based on a current position Pcur and the destination Ptar of the vehicle 10 received from the route guidance device 12.

The GPS sensor 84 (current position detection section) detects the current position Pcur of the vehicle 10.

The calculation section 86 executes a program stored in the storage section 88 in order to control the overall route guidance device 12, and is, for example, configured by a central processing unit (CPU). The calculation section 86 includes a route computation section 100 that generates or computes the route Rv to the destination Ptar either based on occupant (including driver) operation or automatically.

The storage section 88 (FIG. 2) stores programs and data (including a map information database 122) that are used by the computation section 86. The map information database 122 (also referred to below as the "map information DB 122" or the "map DB 122") is stored with road map information (map information Imap). The storage section 88 includes, for example, random access memory (referred to as "RAM" hereafter). The RAM may employ volatile memory configured by resistors or the like, or may employ non-volatile memory configured by flash memory or the like. The storage section 88 may also include read only memory (referred to as "ROM" hereafter) in addition to the RAM.

Note that the present embodiment anticipates the route guidance device 12 being mounted (or permanently fixed) to the vehicle 10. However, for example, the route guidance device 12 may be a smartphone or the like that can be carried away from the vehicle 10. Moreover, some of the functionality of the route guidance device 12 may be achieved by an external device, externally to the vehicle 10. For example, configuration may be made in which the vehicle 10 itself does not include the route computation section 100 and/or the map information DB 122, and acquires the route Rv and/or the map information Imap from the route guide server.

A-1-3. Driving Assistance Device 14

As illustrated in FIG. 1, the driving assistance device 14 includes a forward camera 130, a forward radar 132, the side cameras 134*l*, 134*r*, an LKAS switch 136 (LKAS: Lane Keeping Assist System), and a driving assistance electronic control unit 138 (referred to as the "driving assistance ECU 138" or the "ECU 138" hereafter).

A-1-3-1. Forward Camera 130

The forward camera 130 (also referred to as the "camera 130" below), serving as an imaging section, acquires images Icf (also referred to as "forward images Icf" below) of an area to the front of the vehicle 10. Signals corresponding to the images Icf (referred to as "image signals Scf" or "signals Scf" below) are then output to the ECU 138. Detected objects 200 detected by the forward camera 130 are also referred to as "camera targets 200*c*" below.

Although a single forward camera 130 is employed in the present embodiment, a stereo camera may be configured by two forward cameras 130 disposed with left-right symmetry to each other. The forward camera 130 acquires the images Icf at no fewer than 15 frames per second (for example, at 30 frames per second). Although the forward camera 130 is a color camera that primarily uses light having wavelengths in the visible spectrum, a monochrome camera or an infrared camera may also be employed. The forward camera 130 is, for example, disposed at a vehicle width direction central portion of a front section in the vehicle cabin of the vehicle 10 (for example, in the vicinity of the rear view mirror). Alternatively, the forward camera 130 may be disposed at a vehicle width direction central portion of a front bumper section of the vehicle 10.

A-1-3-2. Forward Radar 132

The forward radar 132 (also referred to as the "radar 132" below) outputs transmitted waves Wt, which are electromagnetic waves (millimeter waves here), to the exterior of the vehicle 10, and receives back reflected waves Wr that, out of the transmitted waves Wt, are waves reflected by the detected objects 200 (including, for example, the nearby vehicle 202 and pedestrians). Detection signals corresponding to the reflected waves Wr (referred to as "reflected wave signals Srf" or "signals Srf" below) are output to the ECU 138. The signals Swr include information Ir (also referred to as "radar information Ir" below) acquired by the radar 132. The detected objects 200 detected by the radar 132 are also referred to as "radar targets 200*r*" below.

The forward radar 132 is disposed at the front side of the vehicle 10 (for example, on a front bumper and/or a front grill). Additionally, other radars may be disposed at a side (for example, in the vicinity of the side mirrors) and/or at the rear side (for example, on a rear bumper and/or a rear grill) of the vehicle 10. A sensor such as a laser radar or an ultrasonic wave sensor may be employed instead of the radar 132 that outputs millimeter waves.

The distance D (FIG. 1) to a detected object 200, the type of detected object 200, and the like can be found using at least one out of the camera target 200*c* detected by the forward camera 130 or the radar target 200*r* detected by the radar 132.

A-1-3-3. Side Cameras 134*l*, 134*r*

The side cameras 134*l*, 134*r* (also referred to as the "cameras 134*l*, 134*r*" or the "left camera 134*l*" and the "right camera 134*r*" below), serving as an imaging section, acquire images Icl, Icr (also referred to as the "side images Icl, Icr" or the "left image Icl" and the "right image Icr" below) from the sides of the vehicle 10. Namely, the left camera 134*l* images an area to the left side of the vehicle 10, and the right camera 134*r* images an area to the right side of the vehicle 10. The cameras 134*l*, 134*r* output signals (referred to as "image signals Scl, Scr" or "signals Scl, Scr" below) corresponding to the images Icl, Icr to the ECU 138.

The cameras 134*l*, 134*r* function as a surroundings information acquisition device that acquires surroundings information including position information Iap of the detected objects 200 (following vehicle 202). In the following explanation, information acquired by the forward camera 130 and the side cameras 134*l*, 134*r* is also referred to as "camera information Ic". The forward images Icf, the left images Icl, and the right images Icr are also referred to as the "surroundings images Ica".

In the present embodiment, the side cameras 134*l*, 134*r* may employ cameras of the same specifications or of different specifications to the forward camera 130. For example, the side cameras 134*l*, 134*r* may be any out of color cameras, monochrome cameras, or infrared cameras. The side cameras 134*l*, 134*r* are disposed at the sides of the vehicle 10 (for example in the vicinity of the side mirrors).

A-1-3-4. LKAS Switch 136

The LKAS switch 136 is a switch with which the driver commands the driving assistance ECU 138 to perform Lane Keeping Assist System control (LKAS control), described later. Another method (such as audio input using a non-illustrated microphone) may be employed to command LKAS control in addition to, or instead of, the LKAS switch 136.

A-1-3-5. Driving Assistance ECU 138

The driving assistance ECU 138 controls the overall driving assistance device 14 and, as illustrated in FIG. 2, includes an input/output section 150, a calculation section 152, and a storage section 154.

The image signals Scf, Scl, Scr from the cameras 130, 134*l*, 134*r*, and the reflected wave signals Srf from the radar 132 are supplied to the driving assistance ECU 138 via the input/output section 150. Communication between the driving assistance ECU 138 and the route guidance device 12, the drive ECU 36, the braking ECU 46, and the EPS ECU 58, is performed via the input/output section 150 and communication lines 156 (FIG. 1). The input/output section 150 includes a non-illustrated A/D converter circuit that converts input analog signals into digital signals.

The calculation section 152 makes calculations based on the signals from the respective sensors, the route guidance device 12, the respective ECUs 36, 46, 58, and the like.

Based on the calculation results, the calculation section 152 generates signals for the route guidance device 12, the drive ECU 36, the braking ECU 46, and the EPS ECU 58. The respective sensors referred to here include the direction indicator switch 22, the vehicle speed sensor 28, the yaw rate sensor 29, the AP sensor 34, the BP sensor 42, the torque sensor 54, the steering angle sensor 56, the cameras 130, 134*l*, 134*r*, and the forward radar 132.

As illustrated in FIG. 2, the calculation section 152 includes a nearby object recognition section 160, a lane marking recognition section 162, an LKAS controller 164, an ALC controller 166 (ALC: Automatic Lane Change), a switching controller 168, and an ALC guidance section 170. These respective sections are implemented by executing a program stored in the storage section 154. The program may be supplied from an external source via a non-illustrated wireless communication device (such as a mobile phone, or a smartphone). Part of the program or these sections may also be configured using hardware (circuit components).

The nearby object recognition section 160 (distance computation section) recognizes the nearby objects 200 based on the camera information Ic from the cameras 130, 134*l*, 134*r* and from the radar information Ir from the radar 132, and outputs information Iao (also referred to below as the "nearby object information Iao") relating to the nearby objects 200. The nearby object information Iao (surroundings information) includes the position of the following vehicle 202 relative to the vehicle 10, and the distance D from the vehicle 10 to the following vehicle 202.

The lane marking recognition section 162 recognizes lane markings (for example the lane markings 504*a* to 504*c* in FIG. 3A to FIG. 3C) based on the camera information Ic (surroundings images Ica) from the cameras 130, 134*l*, 134*r*, and outputs information Ilm (also referred to as "lane marking information Ilm" hereafter) relating to the lane markings. Note that the lane marking recognition section 162 may be configured as part of the nearby object recognition section 160.

The LKAS controller 164 performs Lane Keeping Assist System control (LKAS control) of the vehicle 10 based on the nearby object information Iao from the nearby object recognition section 160, and the lane marking information Ilm from the lane marking recognition section 162.

In LKAS control, the LKAS controller 164 computes a target torque value for the EPS motor 52 (referred to below as the "target LKAS torque Tlkas_tar" or the "target torque Tlkas_tar"). The target torque Tlkas_tar is the torque required to keep the vehicle 10 at a reference position Plkas_ref in the lane in which the vehicle 10 is traveling (also referred to below as the "driving lane").

The ALC controller 166 performs automatic lane change control (ALC control) of the vehicle 10 based on the nearby object information Iao from the nearby object recognition section 160 and the lane marking information Ilm from the lane marking recognition section 162. In ALC control, a target torque value (referred to as the "target ALC torque Talc_tar" or the "target torque Talc_tar" hereafter) of the EPS motor 52 required for automatic lane change (ALC), and a drive force Fd and braking force Fb of the vehicle 10 are computed.

The switching controller 168 executes switching processing to switch between a manual driving mode in which steering and acceleration/deceleration are operated by the driver, and a semi-automated driving mode (partially-automated driving mode) in which some or all of the steering or acceleration/deceleration is performed automatically by LKAS control or ALC control. In other words, the switching controller 168 performs switching of the LKAS control and the ALC control. Note that a fully automated driving mode in which the driver is not involved in steering or acceleration/deceleration may be adopted instead of one or both of the manual driving mode and the semi-automated driving mode.

The ALC guidance section 170 (lane change permission determination section) executes lane change timing guidance control in which determination results for whether or not to permit ALC are output. The determination results of the present embodiment are displayed on the display section 26 (FIG. 4A to FIG. 4C). The lane change timing guidance control will be described later with reference to FIG. 3A to FIG. 5.

The storage section 154 stores programs and data employed by the calculation section 152 and includes RAM. The RAM may employ volatile memory configured by resistors or the like or may employ non-volatile memory configured by flash memory or the like. The storage section 154 may include ROM in addition to the RAM.

A-1-4. Traffic Information Server 300

The traffic information server 300 transmits traffic information to the vehicle 10 based on a request from the vehicle 10. In other words, in the present embodiment, the traffic information server 300 and the communication section 82 of the vehicle 10 perform bidirectional communication with each other. One-way communication broadcast in a manner described later may also be performed.

A-2. Various Control

A-2-1. Explanation of Terminology

FIG. 3A to FIG. 3C are diagrams illustrating a first state, a second state, and a third state in a scenario in which lane change timing guidance control is performed in the present embodiment (as described in detail later). First, terminology common to all control is explained with reference to FIG. 3A to FIG. 3C.

FIG. 3A to FIG. 3C illustrate an expressway 500 with two lanes 502*a*, 502*b* in each direction. In the following explanation, the respective lanes 502*a*, 502*b* are referred to collectively as the lanes 502. The lanes 502 refer to divisions in which the vehicle 10 is allowed to travel.

The respective lanes 502*a*, 502*b* illustrated in FIG. 3A to FIG. 3C are defined by the lane markings 504*a*, 504*b*, 504*c*. In the following explanation, the lane markings 504*a* to 504*c* in FIG. 3A to FIG. 3C are referred to collectively as the lane markings 504. The lanes 502 may be defined by a method other than the lane markings 504. For example, the lanes 502 may be defined based on guard rails, not illustrated in the drawings.

In the examples of FIG. 3A to FIG. 3C, the vehicle 10 is attempting to change lanes (ALC) from the lane 502*a* to the lane 502*b*. The lane 502 in which the vehicle 10 is traveling is also referred to as the current lane 502*s* or the driving lane 502*dr*. In FIG. 3A to FIG. 3C, the lane 502*a* is the driving lane 502*dr*. The lane 502 into which the vehicle 10 is attempting to change (in other words, a lane change destination lane 502) is also referred to as a target lane 502*tar*. The target lane 502*tar* is a lane 502 (adjacent lane) adjacent to the driving lane 502*dr*.

FIG. 3A to FIG. 3C also illustrate roadworks 506 and a lane change space 508 (also referred to below as the "space 508"). The roadworks 506 are present ahead of the vehicle 10 in the driving lane 502*dr*. The lane change space 508 is a space opened up by the following vehicle 202 in order for the vehicle 10 to change lanes.

A-2-2. Overview of the Various Control

As described above, the LKAS controller 164 (FIG. 2) of the present embodiment executes LKAS control. LKAS control is control to keep the vehicle 10 at the reference position Plkas_ref in the driving lane 502*dr*. Note that the reference position Plkas_ref represents a width direction position of the driving lane 502*dr*. A series of the reference positions Plkas_ref forms a reference line (target course) along the direction of progress of the vehicle 10.

The ALC controller 166 executes ALC control. ALC control is control to automatically move the vehicle 10 into the lane 502 on a side (left side or right side) indicated by the direction indicator switch 22 with respect to the driving lane 502*dr* of the vehicle 10. In the present embodiment, when LKAS control is being executed and the direction indicator switch 22 is in an ON state (a state in which the direction indicator lamp 24 is flashing), ALC control is started when the steering wheel 50 is rotated by a predetermined amount in a direction toward the target lane 502*tar*. Note there is also a condition that the nearby vehicle 202 traveling in the adjacent lane 502 does not obstruct the ALC.

The switching controller 168 executes switching processing to switch between the manual driving mode in which steering and acceleration/deceleration are operated by the driver, and the semi-automated driving mode (partially-automated driving mode) in which steering and acceleration/deceleration are performed partially or fully automatically by LKAS control or ALC control. LKAS control and ALC control are executed selectively in the semi-automated driving mode.

A-2-3. LKAS Control

In LKAS control, a driving burden is reduced by assisting operation of the steering wheel 50 so as to enable travel along the reference line configured by the reference positions Plkas_ref in the driving lane 502*dr*. When this is performed, the LKAS controller 164 controls the steering angle θst of the steering wheel 50 using the EPS motor 52.

Namely, the LKAS controller 164 outputs a steering angle θst command to the EPS ECU 58 such that the vehicle 10 will travel at the reference position Plkas_ref in the driving lane 502*dr*. The target LKAS torque Tlkas_tar is employed when controlling the steering angle θst in LKAS control. Moreover, the LKAS controller 164 may output engine 30 operation commands to the drive ECU 36 and output brake mechanism 44 actuation commands to the braking ECU 46 in order to accommodate travel on curved roads and the like.

The reference position Plkas_ref of the present embodiment is a point on a center line of the driving lane 502*dr*. Alternatively, the reference position Plkas_ref may be set at a position offset from the center line by a specific distance in the width direction.

A-2-4. ALC Control

In ALC control, the vehicle 10 is automatically moved into the lane 502 on the side of the driving lane 502*dr* of the vehicle 10 indicated by the direction indicator switch 22 (on the left side or the right side). When this is performed, the ALC controller 166 controls the drive force of the vehicle 10 using the drive ECU 36 and controls the steering angle θst using the EPS ECU 58. The target ALC torque Talc_tar is employed when controlling the steering angle θst in ALC control.

A-2-5. Lane Change Timing Guidance Control
A-2-5-1. Overview

As described above, the ALC guidance section 170 of the driving assistance ECU 138 of the present embodiment executes lane change timing guidance control. The lane change timing guidance control is control to perform guidance relating to the permissibility and timing of ALC.

FIG. 3A to FIG. 3C are diagrams illustrating the first state, the second state, and the third state of a scenario in which lane change timing guidance control is performed in the present embodiment. Specifically, FIG. 3A illustrates a situation in which the following vehicle 202 is drawing close to the vehicle 10 in a state in which the direction indicator lamp 24 of the vehicle 10 is flashing. FIG. 3B illustrates a situation in which the driver of the following vehicle 202 has noticed that the direction indicator lamp 24 of the vehicle 10 is flashing, and has begun to reduce the speed of the following vehicle 202. FIG. 3C illustrates a situation in which the space 508 permitting lane change has been formed between the vehicle 10 and the following vehicle 202 as a result of the following vehicle 202 slowing down.

The arrows attached to the vehicle 10 in FIG. 3A to FIG. 3C represent the vehicle speed V of the vehicle 10. In FIG. 3A to FIG. 3C, the vehicle speed V of the vehicle 10 is substantially constant. The arrows attached to the following vehicle 202 in FIG. 3A to FIG. 3C represent the vehicle speed V of the following vehicle 202. In FIG. 3A, the vehicle speed V of the following vehicle 202 is greater than the vehicle speed V of the vehicle 10. In FIG. 3B, the vehicle speed V of the following vehicle 202 is lower than the vehicle speed V of the vehicle 10 as a result of deceleration of the following vehicle 202. In FIG. 3C, the vehicle speed V of the following vehicle 202 is substantially the same as the vehicle speed V of the vehicle 10.

Note that in FIG. 3A to FIG. 3C, the positions of the vehicle 10 and the roadworks 506 do not appear to change. However, it should be noted that in reality, the distance between the vehicle 10 and the roadworks 506 would progressively decrease in sequence through FIG. 3A, FIG. 3B, and FIG. 3C (in other words, the length of the lane 502 omitted in FIG. 3A to FIG. 3C becomes progressively shorter in sequence through FIG. 3A, FIG. 3B, and FIG. 3C).

Figure 4A:
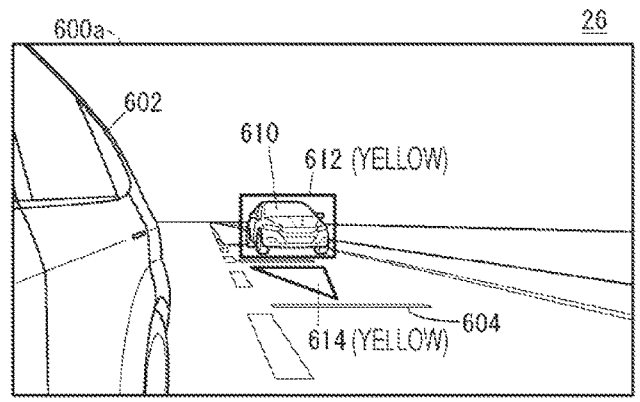
FIG. 4A is a diagram corresponding to FIG. 3A, and illustrates part of a display screen of a display section.

Corresponding to FIG. 3A to FIG. 3C, FIG. 4A to FIG. 4C are diagrams partially illustrating display screens 600*a* to 600*c* of the display section 26. Specifically, FIG. 4A illustrates part of a display screen 600*a* of the display section 26 when the following vehicle 202 is drawing close to the vehicle 10, in a state in which the direction indicator lamp 24 of the vehicle 10 is flashing.

In FIG. 4A, the ECU 138 (ALC guidance section 170) displays a frame 612 (also referred to below as an "alert frame 612") on an image 610 of the following vehicle 202 in order to alert the driver of the vehicle 10 to the approach of the following vehicle 202 (or to the acceleration of the following vehicle 202 relative to the vehicle 10). Moreover, the ECU 138 (ALC guidance section 170) displays a symbol 614 (also referred to below as an "approach symbol 614" or an "acceleration symbol 614") indicating that the following vehicle 202 is approaching (or accelerating). The frame 612 and the approach symbol 614 are colored so as to easily attract the attention of the driver (for example, yellow). The frame 612 and the approach symbol 614 may be the same color as each other or may be different colors to each other. Note that an image 602 is an image representing the vehicle 10 (own-vehicle image). Moreover, a lateral line 604 is an imaginary guideline giving an indication of the relative distance from the vehicle 10.

Figure 4B:
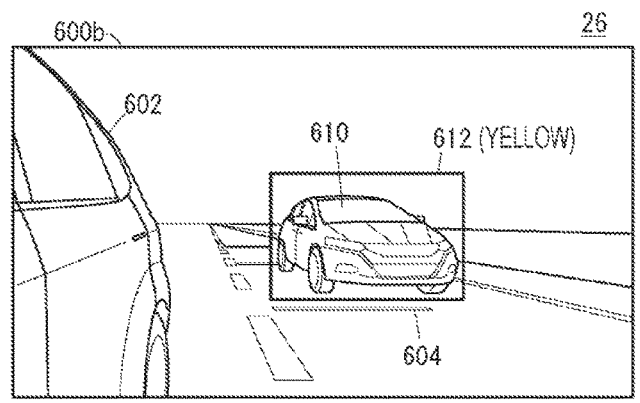
FIG. 4B is a diagram corresponding to FIG. 3B, and illustrates part of a display screen of a display section.

FIG. 4B illustrates part of a display screen 600*b* of the display section 26 when the driver of the following vehicle 202 has noticed that the direction indicator lamp 24 of the vehicle 10 is flashing and has begun to reduce the speed of the following vehicle 202. In FIG. 4B, similarly to in FIG.

4A, the alert frame 612 is displayed on the image 610 of the following vehicle 202. The frame 612 becomes larger accompanying the approach of the following vehicle 202. However, since the following vehicle 202 has begun to decelerate, the approach symbol 614 is not displayed.

Figure 4C:
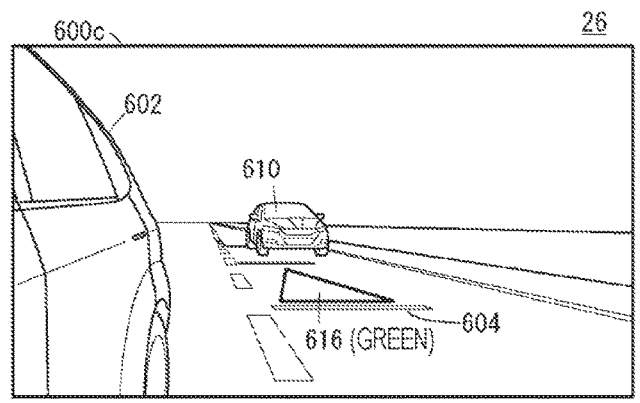
FIG. 4C is a diagram corresponding to FIG. 3C, and illustrates part of a display screen of a display section.

FIG. 4C illustrates part of a display screen 600c of the display section 26 when the space 508 permitting lane change has been formed between the vehicle 10 and the following vehicle 202 as a result of deceleration of the following vehicle 202. In FIG. 4C, in order to advise the driver of the vehicle 10 of the moving-away of the following vehicle 202 (or the deceleration of the following vehicle 202 relative to the vehicle 10), the ECU 138 (ALC guidance section 170) displays a symbol 616 (also referred to below as the "moving-away symbol 616" or the "deceleration symbol 616") representing the moving-away (or deceleration) of the following vehicle 202. The moving-away symbol 616 is colored so as to indicate a lower alert level than the approach symbol 614 (green, for example). Note that the alert frame 612 is not displayed when the moving-away symbol 616 is displayed.

A-2-5-2. Specific Flow of Lane Change Timing Guidance Control

Figure 5:
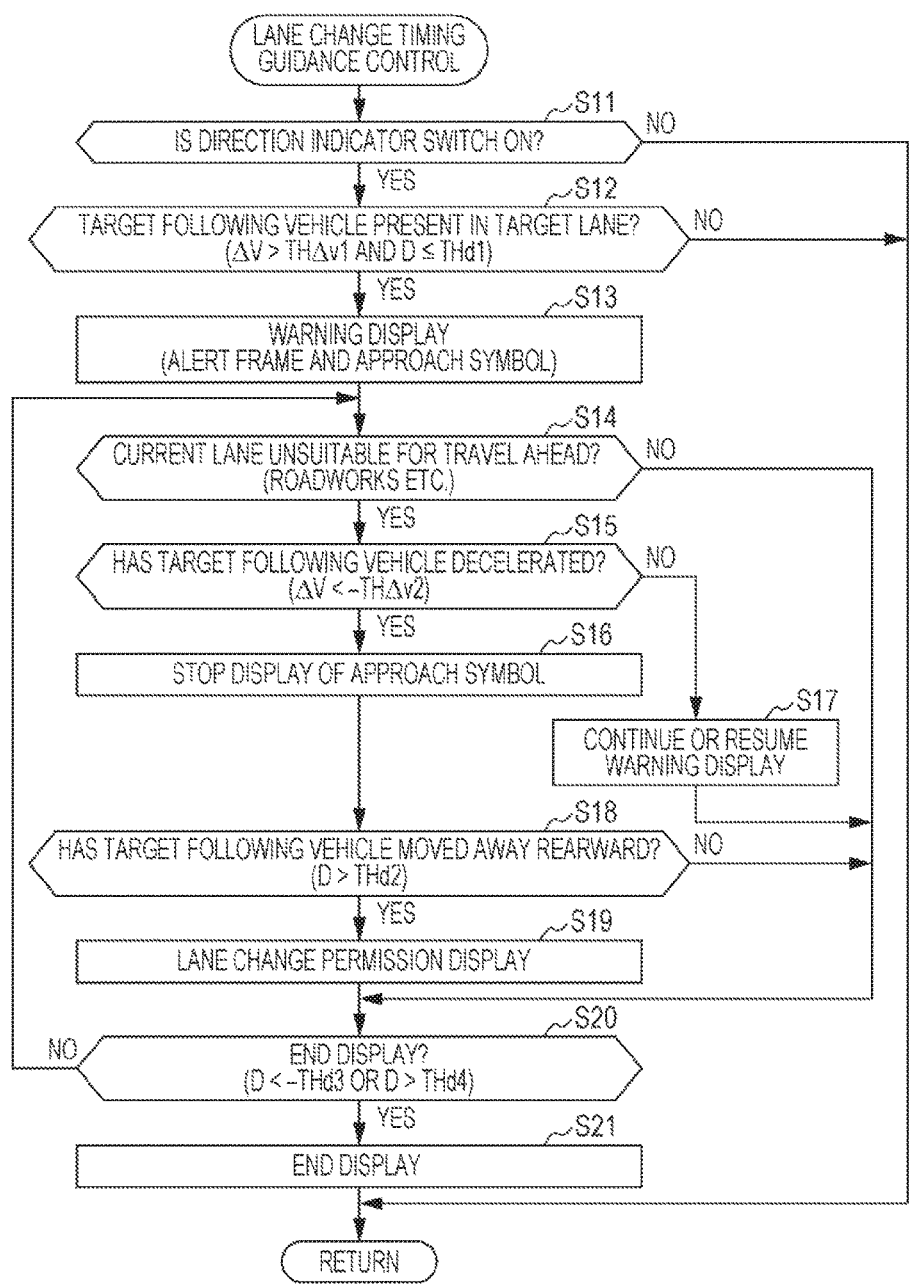
FIG. 5 is a flowchart of lane change timing guidance control of an embodiment.

FIG. 5 is a flowchart of lane change timing guidance control of the present embodiment. As described above, the lane change timing guidance control is executed by the ALC guidance section 170 of the ECU 138. At step S11 in FIG. 5, the ECU 138 determines whether or not the direction indicator switch 22 is ON. Processing proceeds to step S12 when the direction indicator switch 22 is ON (S11: YES).

At step S12, the ECU 138 determines whether or not a specific following vehicle 202 (also referred to below as the "target following vehicle 202tar") is present in the target lane 502tar. The target following vehicle 202tar corresponds to a vehicle for which a difference $\Delta V$ (=Va−Vs) between the vehicle speed V of the following vehicle 202 (Va) and the vehicle speed V of the vehicle 10 (Vs) is greater than a first vehicle speed threshold value TH$\Delta$v1, and a distance D from the vehicle 10 to the following vehicle 202 is a first distance threshold value THd1 or lower. Conversely, if the difference $\Delta V$ is the first vehicle speed threshold value TH$\Delta$v1 or lower or if the distance D is greater than the first distance threshold value THd1, the ECU 138 determines that a target following vehicle 202tar is not present, even if there is a following vehicle 202 traveling in the target lane 502tar.

The first vehicle speed threshold value TH$\Delta$v1 is a positive threshold value for determining that the following vehicle 202 is rapidly approaching the vehicle 10. Note that a negative threshold value may be configured by subtracting the vehicle speed V of the following vehicle 202 from the vehicle speed V of the vehicle 10. The first distance threshold value THd1 is a positive threshold value set in order for the vehicle 10 to perform ALC (in the present embodiment, a distance D to the rear of the vehicle 10 is treated as a positive value, and a distance D to the front of the vehicle 10 is treated as a negative value).

Note that at step S12, there is no limitation to the following vehicle 202, and nearby vehicles at the side of the vehicle 10 may be included as display target vehicles (target vehicles) for the frame 612 and the symbols 614, 616.

When a target following vehicle 202tar is present in the target lane 502tar (S12: YES), at step S13, the ECU 138 displays a warning display on the display section 26. Specifically, as illustrated in FIG. 4A, the ECU 138 displays the alert frame 612 surrounding the image 610 (also referred to below as the "following vehicle image 610") of the following vehicle 202. Moreover, the ECU 138 also displays the approach symbol 614 indicating that the following vehicle 202 is approaching the vehicle 10.

At step S14, the ECU 138 determines whether or not the current lane 502s is unsuitable for travel ahead. For example, "the current lane 502s being unsuitable for travel ahead" includes the following cases.

(a) The roadworks 506 (FIG. 3A, etc.) being present ahead in the current lane 502s.

(b) An obstacle such as a broken-down vehicle, a parked vehicle, or the like being present ahead in the current lane 502s.

(c) The current lane 502s merging with the adjacent lane (target lane 502tar) (the current lane 502s coming to an end).

When the current lane 502s is unsuitable for travel ahead (S14: YES), processing proceeds to step S15, and when the current lane 502s is not unsuitable for travel ahead (S14: NO), processing proceeds to step S20.

At step S15, the ECU 138 determines whether or not the target following vehicle 202tar has decelerated. Specifically, the ECU 138 determines whether or not the difference $\Delta V$ between the vehicle speed V of the following vehicle 202 and the vehicle speed V of the vehicle 10 has dropped below a second vehicle speed threshold value −TH$\Delta$v2. The second vehicle speed threshold value −TH$\Delta$v2 is a negative threshold value for determining that the following vehicle 202 has decelerated (a TH$\Delta$v2 with the minus sign removed is a positive value). Note that a negative threshold value may be employed by subtracting the vehicle speed V of the following vehicle 202 from the vehicle speed V of the vehicle 10.

When the difference $\Delta V$ is lower than the second vehicle speed threshold value −TH$\Delta$v2 (step S15: YES), at step S16, the ECU 138 stops display of the approach symbol 614 (see FIG. 4B). However, if the difference $\Delta V$ is not lower than the second vehicle speed threshold value −TH$\Delta$v2 (step S15: NO), at step S17, the ECU 138 continues or resumes the warning display (display of the frame 612 and the approach symbol 614) (see FIG. 4A). Note that cases in which warning display is resumed refer to cases in which the target following vehicle 202tar briefly decelerates (S15: YES) before accelerating again, or cases in which the target following vehicle 202tar drops back toward the rear (S18: YES) before approaching again.

At step S18, the ECU 138 determines whether or not the target following vehicle 202tar has moved away from the vehicle 10. Specifically, the ECU 138 determines whether or not the distance D from the vehicle 10 to the following vehicle 202 is greater than a second distance threshold value THd2. The second distance threshold value THd2 is a positive threshold value set in order for the vehicle 10 to perform ALC when the target following vehicle 202tar has decelerated, and is smaller than the first distance threshold value THd1. When the distance D is greater than the second distance threshold value THd2 (S18: YES), processing proceeds to step S19, and when the distance D is not greater than the second distance threshold value THd2 (S18: NO), processing proceeds to step S20.

At step S19, the ECU 138 performs lane change permission display. Specifically, as illustrated in FIG. 4C, the ECU 138 displays the moving-away symbol 616 indicating the moving-away (or deceleration) of the following vehicle 202 on the display section 26. When this is performed, the ECU 138 stops displaying the alert frame 612.

At step S20, the ECU 138 determines whether or not to end the warning display (FIG. 4A, FIG. 4B) or the lane change permission display (FIG. 4C). Specifically, for the warning display, the ECU 138 determines whether or not the distance D has become smaller than a negative third distance threshold value −THd3. The third distance threshold value −THd3 is a threshold value for determining that the target following vehicle 202tar has moved a sufficient distance to the front of the vehicle 10 (a THd3 with the minus sign removed is a positive value). Namely, determination is made as to whether the target following vehicle 202tar has overtaken the vehicle 10.

Moreover, for the lane change permission display, the ECU 138 determines whether or not the distance D has become greater than a fourth distance threshold value THd4. The fourth distance threshold value THd4 is a positive threshold value for determining that the target following vehicle 202tar has moved a sufficient distance to the rear of the vehicle 10, and may be set equal to or greater than the first distance threshold value THd1. Setting the fourth distance threshold value THd4 greater than the first distance threshold value THd1 enables the warning display to be given hysteresis characteristics.

At step S20, in addition to, or instead of the above, determination may be made as to whether or not an elapsed time since the start of warning display or lane change permission display has exceeded a time threshold value.

When warning display or lane change permission display is to be ended (S20: YES), at step S21, the ECU 138 ends the warning display or the lane change permission display. When warning display or lane change permission display is not to be ended (S20: NO), processing returns to step S14.

A-3. Advantageous Effects of Present Embodiment

As described above, in the present embodiment, in cases in which the target following vehicle 202tar is present (S12: YES), in other words, if, after lane change has been determined to be not permitted due to the target following vehicle 202tar (nearby vehicle) approaching the vehicle 10, but the target following vehicle 202tar has then decelerated and moved further away from the vehicle 10 than the second distance threshold value THd2 (S18: YES), the determination result is switched from lane changing not being permitted to lane change being permitted (S19), even if the distance D between the vehicle 10 and the target following vehicle 202tar is still shorter than the first distance threshold value THd1. Accordingly, for example, when the target following vehicle 202tar has reduced its speed to open up a space for the vehicle 10 to change lanes, lane change permission is granted quickly, from the point in time that the second distance threshold value THd2, that is shorter than the first distance threshold value THd1, has been exceeded.

In the present embodiment, the direction indicator switch 22 being ON (in other words, a command to flash the direction indicator lamp 24 having been given) (S11: YES in FIG. 5) is set as a condition for the ALC guidance section 170 (lane change permission determination section) of the ECU 138 to start output of a determination result for the permissibility of lane change (S13, S19).

Accordingly, determination results for the permissibility of lane change are not output when the direction indicator lamp 24 is not flashing. Accordingly, when lane change is not required, determination results for the permissibility of lane change are not output, enabling the presentation of information of low importance to be omitted. This enables the convenience for the driver to be improved.

In the present embodiment, the ALC guidance section 170 (lane change permission determination section) of the ECU 138 determines whether or not the current lane 502s in which the vehicle 10 is traveling is unsuitable for travel ahead (S14 in FIG. 5). The current lane 502s being unsuitable for travel ahead (S14: YES) is set as a condition for the ECU 138 to start output of a determination result as to the permissibility of lane change (S13, S19).

Accordingly, for example, output of a determination result for the permissibility of lane change can be started (S13, S19 in FIG. 5) when it is anticipated that the target following vehicle 202tar (nearby vehicle) will open up a space 508 for the vehicle 10 to change lanes (FIG. 3C). Accordingly, when lane change is not required, determination results for the permissibility of lane change are not output, enabling the presentation of information of low importance to be omitted. This enables the convenience for the driver to be improved.

In the present embodiment, the ALC guidance section 170 (lane change permission determination section) of the ECU 138 outputs the determination result for the permissibility of lane change as a display (FIG. 4A to FIG. 4C, S13, S17, S19 in FIG. 5). Accordingly, in configurations in which ALC is performed as a result of driver operation, the permissibility of lane change can be presented in a form that is easy for the driver to recognize.

In the present embodiment, the display of the ALC guidance section 170 (lane change permission determination section) of the ECU 138 includes the acceleration symbol 614 indicating the acceleration of the target following vehicle 202tar relative to the vehicle 10 and the deceleration symbol 616 indicating the deceleration of the target following vehicle 202tar relative to the vehicle 10 (FIG. 4A and FIG. 4C). An occupant (including the driver) can thereby easily visually ascertain the movement of the target following vehicle 202tar relative to the vehicle 10. As a result, the driver of the vehicle 10 is capable of quickly recognizing that the target following vehicle 202tar has opened up the space 508 for changing lanes.

In the present embodiment, the ALC guidance section 170 (lane change permission determination section) of the ECU 138 outputs the display indicating the determination result for the permissibility of lane change only for nearby vehicles 202 for which the difference ΔV between the vehicle speed V of the following vehicle 202 and the vehicle speed V of the vehicle 10 (in other words, the speed with which the following vehicle 202 is approaching the vehicle 10) is greater than the first vehicle speed threshold value THΔv1 (speed threshold value) (FIG. 4A to FIG. 4C, S13, S17, S19 in FIG. 5).

Accordingly, a determination result for the permissibility of lane change (the frame 612, symbols 614, 616, and the like) is not displayed for nearby vehicles 202 that are moving more slowly relative to the vehicle 10 (or that are moving away from the vehicle 10), for example. Accordingly, it is possible to emphasize nearby vehicles 202 (target following vehicles 202tar) that require attention, while enabling annoyance caused to the driver by performing display for every nearby vehicle 202 traveling in the adjacent lane 502 to be eliminated.

B. MODIFIED EXAMPLES

Note that the present disclosure is not limited to the above embodiment, and obviously various configurations may be adopted based on the contents of the present specification. For example, the following configurations may be adopted.

B-1. Application Target

In the embodiment described above, the present disclosure is applied to the vehicle 10 (FIG. 1). However, for example, from the perspective of guidance or determination of a timing for lane change, there is no limitation thereto, and the present disclosure may be applied to other moving objects. For example, the present disclosure may be applied to boats or robots.

B-2. Driving Assistance Device 14 Configuration

In the embodiment described above, the cameras 134*l*, 134*r* (camera information Ic) are employed to detect objects 200 to the rear or sides of the vehicle 10 (FIG. 1, FIG. 4A to FIG. 4C). However, for example, there is no limitation thereto from the perspective of detecting nearby objects 200 (FIG. 1).

For example, side radars and/or rear radars may be employed to perform measurements to the rear and side in order to detect nearby objects 200. Alternatively, communication between the vehicle 10 and the following vehicle 202 (vehicle-to-vehicle communication) may be employed. In vehicle-to-vehicle communication, the vehicle 10 may recognize the position of the following vehicle 202 by acquiring position information Iap of the following vehicle 202 from the following vehicle 202. Alternatively, the vehicle 10 may receive and employ the results of the following vehicle 202 detecting the vehicle 10 or nearby vehicles. In such cases, the ECU 138 may notify lane change permission through a medium other than images (for example audio output, applying vibration, or turning on an in-vehicle lamp).

In the embodiment described above, the side cameras 134*l*, 134*r* are employed to detect objects 200 to the rear or sides of the vehicle 10 (FIG. 1, FIG. 4A to FIG. 4C). However, for example, the front camera 130 and the like may be employed to detect objects 200 ahead of the vehicle 10 in cases in which a lane change timing is guided or determined for a target vehicle traveling ahead in the target lane 502*tar*, as described later. Alternatively, the front camera 130, the side cameras 134*l*, 134*r*, and the like may be employed in combination to configure a 360° detection range for objects 200 around the vehicle 10.

In the embodiment described above, the LKAS controller 164, the ALC controller 166, the switching controller 168, and the ALC guidance section 170 are included in the single driving assistance ECU 138 (FIG. 2). However, for example, there is no limitation thereto from the perspective of guidance or determination for lane change permission. For example, the LKAS controller 164, the ALC controller 166, the switching controller 168, and the ALC guidance section 170 may each be included in separate electronic control units (ECUs). For example, the ALC guidance section 170 may be included in the route guidance device 12.

In the embodiment described above, the driving assistance ECU 138 includes the LKAS controller 164, the ALC controller 166, the switching controller 168, and the ALC guidance section 170 (FIG. 2). However, for example, there is no limitation thereto from the perspective of guidance or determination for lane change permission. For example, the LKAS controller 164, the ALC controller 166, the switching controller 168, and the ALC guidance section 170 may be omitted from the ECU 138, and the ECU 138 may include a section (lane change guidance section) for manual lane change permission or timing guidance.

B-3. ECU 138 Control

B-3-1. Application Scenarios

In the embodiment described above, an example is given in which lane change timing guidance is performed on the expressway 500 (FIG. 3A to FIG. 3C). However, the lane change timing guidance control in FIG. 5 may also be applied on roads other than an expressway 500 (for example, ordinary roads). Alternatively, lane change timing guidance control may be executed only when on an expressway 500. In such cases, determination as to whether or not the vehicle 10 is traveling on an expressway 500 may be made prior to step S11 in FIG. 5.

In the embodiment described above, lane change timing guidance is performed with the following vehicle 202 as a target vehicle (FIG. 3A to FIG. 5). However, for example, there is no limitation thereto from the perspective of guidance or determination of timings for ALC or for manual lane changing adapted for the movement of nearby vehicles. For example, lane change timing guidance or determination may be performed taking a vehicle ahead in the target lane 502*tar* as a target vehicle.

When the target vehicle is a vehicle in front, acceleration of the target vehicle in front may be determined in place of determining deceleration of the target following vehicle 202*tar* (S15 in FIG. 5). In such cases, the placement of the acceleration symbol 614 in FIG. 4A and the deceleration symbol 616 in FIG. 4C is reversed. Namely, when the target vehicle is a vehicle in front, a symbol (deceleration symbol) indicating deceleration of the target vehicle in front is colored so as to easily attract the attention of the driver (for example, yellow or red), and a symbol (acceleration symbol) indicating acceleration of the target vehicle in front is given a color that does not attract the attention of the driver so readily (for example, green or blue).

B-3-2. Lane Change Timing Guidance Method

In the embodiment described above, an example is described in which, as a lane change timing guidance method of the ECU 138, timing guidance is performed for manually instructed ALC (FIG. 4A to FIG. 4C, S13, S17, S19 of FIG. 5). However, for example, there is no limitation thereto from the perspective of guidance or determination for timings for ALC or manual lane changing adapted for the movement of the following vehicle 202. For example, the present disclosure may be applied to a configuration in which ALC start is decided automatically by the vehicle 10 (and not by the driver). Alternatively, the present disclosure may be applied to a configuration in which timing guidance is performed for manual lane changing in which steering is performed by the driver.

Figure 6:
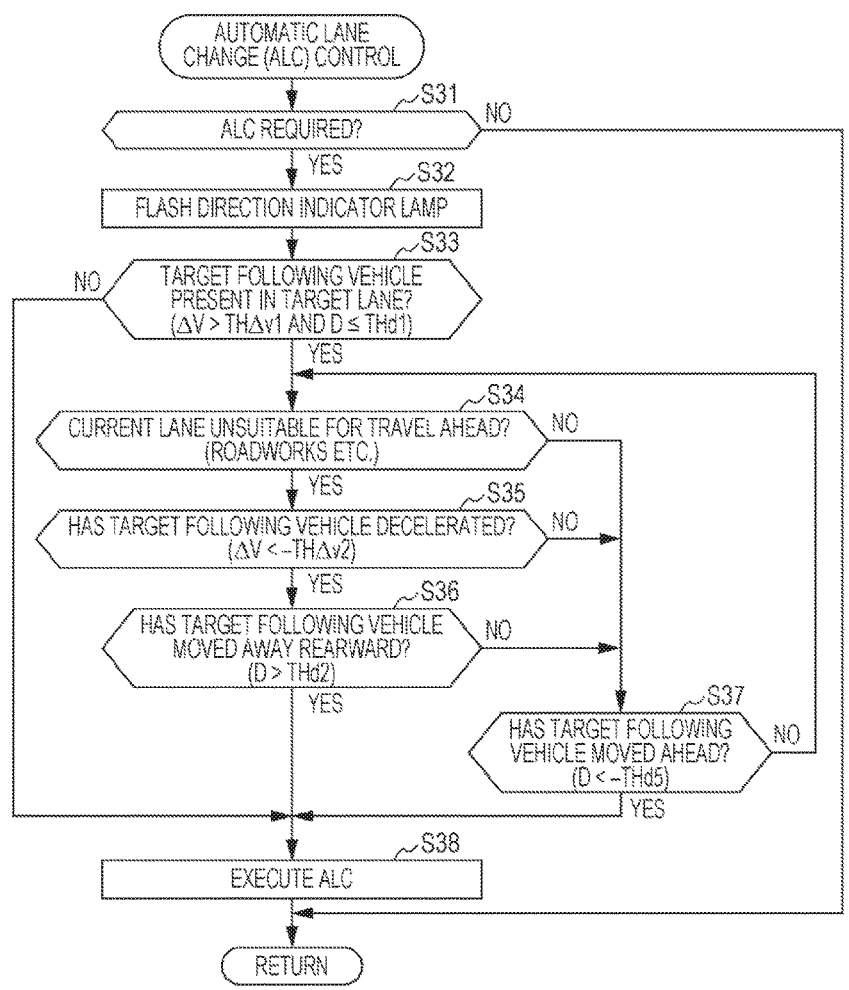
FIG. 6 is a flowchart of automatic lane change (ALC) control according to a modified example.

FIG. 6 is a flowchart of automatic lane change (ALC) control according to a modified example. The ALC control in FIG. 6 is employed in a configuration in which ALC start is decided automatically by the vehicle 10 (and not by the driver). When ALC control is started, a destination Pgoal of the vehicle 10 has already been set.

At step S31 in FIG. 6, the ECU 138 determines whether or not ALC is required. For example, the ECU 138 determines ALC to be required in cases in which it is necessary to change lanes 502 in order for the vehicle 10 to approach the destination Pgoal. When ALC is required (S31: YES), at step S32, the ECU 138 causes the direction indicator lamp 24 to flash. The direction indicator lamp 24 continues to flash until completion of step S38.

At step S33, the ECU 138 determines whether or not a target following vehicle 202*tar* is present in the target lane 502*tar*. This determination is similar to that of step S12 in FIG. 5. There is no limitation to the following vehicle 202 at step S33, and nearby vehicles to the sides or front of the vehicle 10 may be added as target vehicles.

When a target following vehicle 202*tar* is not present in the target lane 502*tar* (S33: NO), at step S38, the ECU 138 executes ALC. When a target following vehicle 202*tar* is present in the target lane 502*tar* (S33: YES), processing proceeds to step S34.

Steps S34, S35, and S36 are similar to steps S14, S15, and S18 in FIG. 5. When the current lane 502*s* is unsuitable for travel ahead (S34: YES), the target following vehicle 202*tar* decelerates (S35: YES), and the target following vehicle 202*tar* moves away to the rear (S36: YES), the ECU 138 executes ALC at step S38.

When the outcome is NO at any of steps S34, S35, or S36, processing proceeds to step S37. At step S37, the ECU 138 determines whether or not the target following vehicle 202*tar* has moved ahead of the vehicle 10. Specifically, the ECU 138 determines whether or not the distance D from the vehicle 10 to the following vehicle 202 has fallen below a negative fifth distance threshold value −THd5. Similarly to the third distance threshold value −THd3 (S20 in FIG. 5), the fifth distance threshold value −THd5 is a threshold value to determine that the target following vehicle 202*tar* has moved a sufficient distance to the front of the vehicle 10. Namely, determination is made as to whether the target following vehicle 202*tar* has overtaken the vehicle 10.

When the target following vehicle 202*tar* has not moved ahead of the vehicle 10 (S37: NO), processing returns to step S34. When the target following vehicle 202*tar* has moved ahead of the vehicle 10 (S37: YES), at step S38 the ECU 138 executes ALC. Note that the ECU 138 confirms that there is no new target following vehicle 202*tar* present before executing ALC. Processing returns to step S34 if a new target following vehicle 202*tar* is present.

The modified example (FIG. 6) described above is capable of exhibiting the following advantageous effects in addition to, or instead of, the advantageous effects of the present embodiment.

Namely, in the modified example, the ALC guidance section 170 (lane change permission determination section) of the ECU 138 outputs a determination result for the permissibility of lane change in ALC during automated driving. This thereby enables appropriate lane changing to be performed in a configuration in which ALC is performed by automated driving.

In the embodiment described above, a condition of the direction indicator switch 22 being ON is set as a condition for lane change timing guidance by the ECU 138 (S11 in FIG. 5). However, for example, there is no limitation thereto from the perspective of guiding or determining timings for ALC or for manual lane changing adapted for the movement of the following vehicle 202 or the like. For example, flashing of the direction indicator lamp 24 may be set as a condition for lane change timing guidance. Alternatively, lane change timing guidance may be performed irrespective of whether or not the direction indicator lamp 24 is flashing (encompassing the direction indicator switch 22 being ON).

B-3-3. Information Regarding the Current Lane 502*s* Ahead (S14 in FIG. 5)

In the above embodiment, traffic information (of the roadworks 506 or the like) is acquired from the traffic information server 300 (FIG. 1). However, for example, there is no limitation thereto from the perspective of acquiring traffic information. For example, broadcast waves transmitted by a broadcasting antenna at a broadcasting station may be received in order to acquire traffic information included in the broadcast waves.

In the above embodiment, determination is made as to whether or not the current lane 502*s* is unsuitable for travel ahead (S14 in FIG. 5). However, for example, there is no limitation thereto from the perspective of guidance or determination of lane change permission. For example, configuration may be made in which determination is not made as to whether or not the current lane 502*s* is unsuitable for travel ahead (in other words, configuration in which S14 in FIG. 5 is omitted).

B-4. Driving Assistance ECU 138 Control

In the embodiment described above, ALC control and LKAS control involve driver operation. However, there is no limitation thereto from the perspective of guiding the timing of manually instigated ALC or manual lane changing, or executing ALC automatically. For example, ALC control and LKAS control (or ACC) may be employed in fully automated driving control.

In the example in FIG. 3A to FIG. 3C, the lane markings 504 are envisaged as being white lines on the road (continuous lines and intermittent lines). However, for example, there is no limitation thereto from the perspective of the lane markings 504 that define the current lane 502*s* and the target lane 502*tar*. For example, the lane markings 504 may be yellow lines, Botts Dots, or cats' eyes. Alternatively, the lane markings 504 may be configured by a guard rail itself, or by virtual lane markings set a specific distance from a guard rail.

In the embodiment described above, the LKAS reference position Plkas_ref and the ALC reference position Palc_ref themselves are employed. However, the reference positions Plkas_ref, Palc_ref may be employed as reference regions (target regions).

In the embodiment described above, the difference $\Delta V$ is configured by a value obtained by subtracting the vehicle speed V of the vehicle 10 (Vs) from the vehicle speed V of the following vehicle 202 (Va) ($\Delta V = Va - Vs$). However, for example, from the perspective of employing the difference between the two values, the difference $\Delta V$ may be configured by a value obtained by subtracting the vehicle speed V of the following vehicle 202 (Va) from the vehicle speed V of the vehicle 10 (Vs). In such cases, the positive/negative signs of the first vehicle speed threshold value TH$\Delta$v1 (S12 in FIG. 5) and the second vehicle speed threshold value −TH$\Delta$v2 (S15) are reversed, and the direction of the inequality sign is also reversed. The same applies to the modified example (FIG. 6).

In the embodiment described above, the distance D toward the rear of the vehicle 10 is set as a positive value, and the distance D toward the front of the vehicle 10 is set as a negative value. However, for example, from the perspective of employing the distance between the vehicle 10 and the following vehicle 202, the distance D toward the rear of the vehicle 10 may be set as a negative value, and the distance D toward the front of the vehicle 10 may be set as a positive value. In such cases, the positive/negative signs of the first distance threshold value THd1 (S12 in FIG. 5), the second distance threshold value THd2 (S18), the third distance threshold value −THd3 (S20), and the fourth distance threshold value THd4 (S20) are reversed, and the direction of the inequality sign is also reversed. The same applies to the modified example (FIG. 6).

The embodiment described above includes both cases in which equality is included in comparisons of numerical values, and cases in which equality is not included (S12, S15, S18, S20 in FIG. 5). However, for example, if there is no special significance to including the equality, whether or not to include equality in comparisons of numerical values may be freely set. The same applies to the modified example (FIG. 6). Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle comprising:
   a surroundings information acquisition device configured to acquire surroundings information of a vehicle including a position information of a nearby vehicle travelling in an adjacent lane; and an electronic control unit configured to employ the position information of the nearby vehicle to guide a timing of an automatic lane change or a manual lane change or to execute the automatic lane change; wherein
the electronic control unit includes:
  a distance computation section configured to compute a distance from the vehicle to the nearby vehicle, and
  a lane change permission determination section configured to determine permissibility of a lane changing of the vehicle and to output a determination result;
the lane change permission determination section is configured to:
  determine the lane changing to be permitted when the distance is greater than a first distance threshold value,
  determine the lane changing to be not permitted when the nearby vehicle is approaching the vehicle and the distance is shorter than the first distance threshold value, and
  after determining the lane changing to be not permitted due to the nearby vehicle approaching the vehicle and the distance is shorter than the first distance threshold value, switch the determination result from the lane changing not permitted to the lane changing permitted when the nearby vehicle decelerates or accelerates to move further away from the vehicle than a second distance threshold value, even if the distance is still shorter than the first distance threshold value.

2. The vehicle according to claim 1, wherein:
the lane change permission determination section starts output of the determination result for the permissibility of the lane changing when a condition is satisfied, the condition including flashing of a direction indicator lamp or a command to flash the direction indicator lamp.

3. The vehicle according to claim 1, wherein:
the nearby vehicle is a following vehicle traveling further to the rear than the vehicle; and
the lane change permission determination section is configured to determine whether or not a current lane in which the vehicle is traveling is unsuitable for travel ahead, and
the lane change permission determination section starts output of the determination result for the permissibility of the lane changing when a condition is satisfied, the condition including that the current lane is unsuitable for travel ahead.

4. The vehicle according to claim 1, wherein:
the lane change permission determination section outputs the determination result for the permissibility of the lane changing by using at least one of display and audio.

5. The vehicle according to claim 4, wherein:
the lane change permission determination section outputs the determination result for the permissibility of the lane changing by using at least the display; and
the display includes a symbol indicating deceleration or acceleration of the nearby vehicle relative to the vehicle.

6. The vehicle according to claim 1, wherein:
the lane change permission determination section outputs a display indicating the determination result for the permissibility of the lane changing only when the nearby vehicle has a speed of approach to the vehicle exceeding a speed threshold value.

7. The vehicle according to claim 1, wherein the lane change permission determination section outputs the determination result for the permissibility of the lane changing as a part of the automatic lane change during automated driving.

8. A lane change timing determination method that determines a timing of an automatic lane change or a manual lane change in a vehicle comprising a surroundings information acquisition device configured to acquire surroundings information of the vehicle including position information of a nearby vehicle traveling in an adjacent lane, and an electronic control unit configured to employ the position information of the nearby vehicle to guide the timing of the automatic lane change or the manual lane change or to execute the automatic lane change, the method comprising:
the electronic control unit executing:
  distance computation to compute a distance from the vehicle to the nearby vehicle traveling in the adjacent lane, and
  lane change permission determination to determine permissibility of a lane changing of the vehicle and to output a determination result;
in the lane change permission determination, the electronic control unit:
  determining the lane changing to be permitted when the distance is greater than a first distance threshold value,
  determining the lane changing to be not permitted when the nearby vehicle is approaching the vehicle and the distance is shorter than the first distance threshold value, and
  after determining the lane changing to be not permitted due to the nearby vehicle approaching the vehicle and the distance is shorter than the first distance threshold value, switching the determination result from the lane changing not permitted to the lane changing permitted when the nearby vehicle decelerates or accelerates to move further away from the vehicle than a second distance threshold value, even if the distance is still shorter than the first distance threshold value.

9. The vehicle according to claim 1, wherein the second distance threshold value is shorter than the first distance threshold value.

10. The vehicle according to claim 9, wherein after determining the lane changing to be not permitted due to the nearby vehicle approaching the vehicle and the distance is shorter than the first distance threshold value, the lane change permission determination section is configured to switch the determination result from the lane changing not permitted to the lane changing permitted when the nearby vehicle decelerates to move further away from the vehicle than the second distance threshold value, even if the distance is still shorter than the first distance threshold value.

11. The vehicle according to claim 1, wherein:
the lane change permission determination section outputs the determination result for the permissibility of the lane changing only when the nearby vehicle has a speed of approach to the vehicle exceeding a speed threshold value.

* * * * *